United States Patent [19]

Bodycomb

[11] 3,994,193

[45] Nov. 30, 1976

[54] AIR BEARING SLITTER

[75] Inventor: Alistair K. Bodycomb, Baie d'Urfe, Canada

[73] Assignee: Domtar Limited, W. Montreal, Canada

[22] Filed: Sept. 23, 1974

[21] Appl. No.: 508,180

[30] Foreign Application Priority Data

Oct. 1, 1973 Canada .................. 182249

[52] U.S. Cl. .................. 83/501; 83/659; 83/665; 308/DIG. 1

[51] Int. Cl.² .................. B23D 19/04; B26D 1/24

[58] Field of Search .......... 83/407, 501, 502, 503, 83/561, 665, 659, 676; 308/DIG. 1; 226/194, 196

[56] References Cited

UNITED STATES PATENTS

| | | | |
|---|---|---|---|
| 2,571,201 | 10/1951 | Clem | 83/501 X |
| 3,172,321 | 3/1965 | Schrader | 83/659 X |
| 3,501,280 | 3/1970 | Myers | 83/676 X |
| 3,746,233 | 7/1973 | Bauer et al. | 308/DIG. 1 X |
| 3,753,517 | 8/1973 | Takenaka | 308/DIG. 1 X |

FOREIGN PATENTS OR APPLICATIONS

| | | | |
|---|---|---|---|
| 238,197 | 3/1924 | Canada | 83/502 |
| 859,428 | 12/1940 | France | 83/502 |
| 1,156,635 | 8/1961 | Germany | 83/502 |

*Primary Examiner*—Othell M. Simpson
*Assistant Examiner*—Fred A. Silverberg
*Attorney, Agent, or Firm*—C. A. Rowley

[57] ABSTRACT

An air bearing slitter wherein the slitter disc is mounted on a hub that is freely rotatable and axially movable relative to a shaft on an air bearing. This arrangement has been found to improve the slitter knife life between sharpenings and to permit the use of tungsten carbide coated slitters for slitting paper.

6 Claims, 4 Drawing Figures

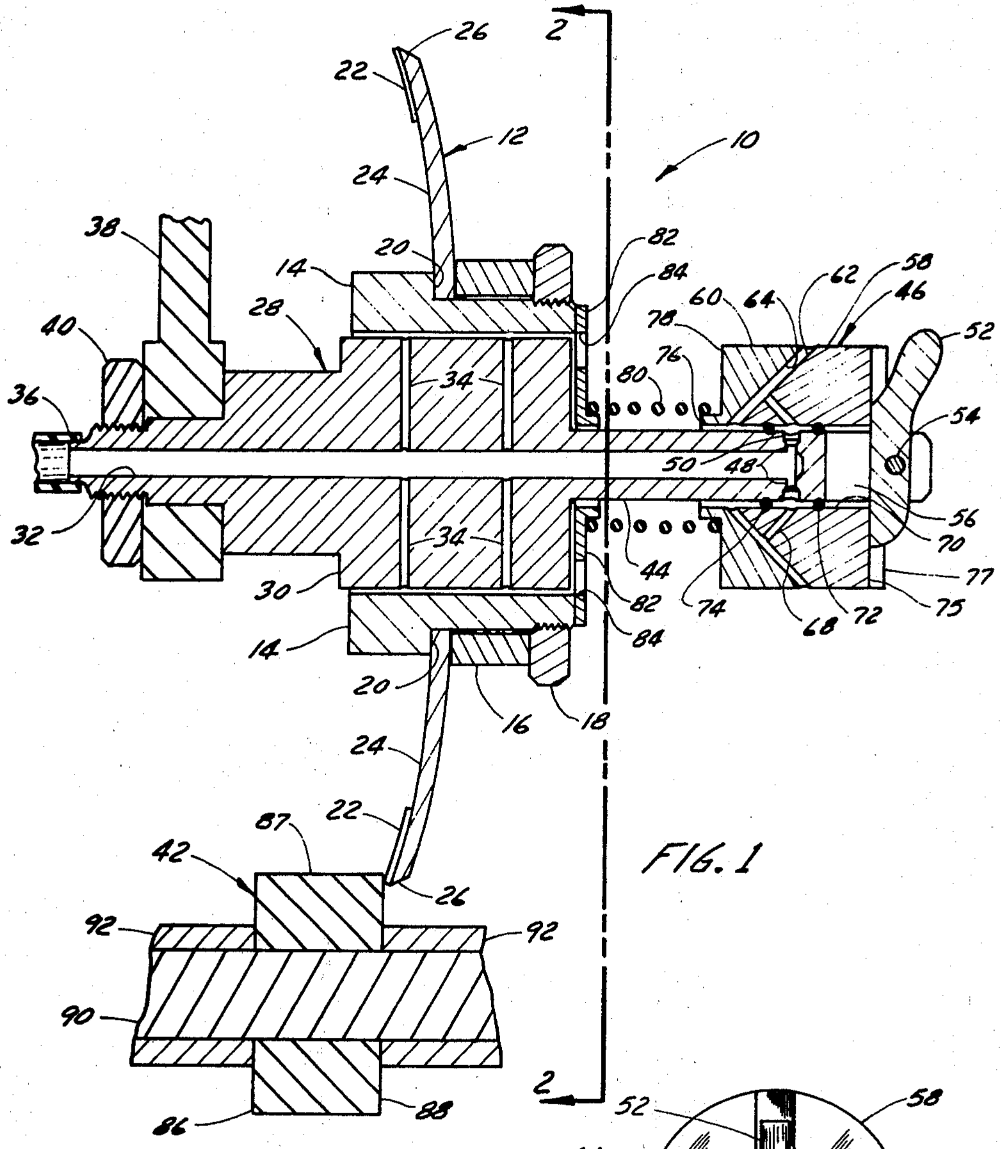
F/G. 1
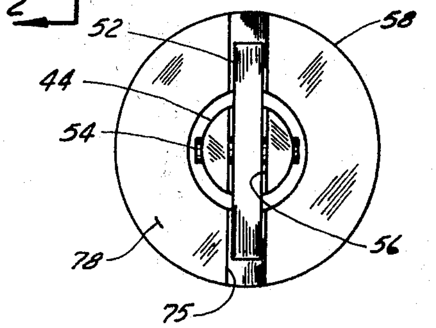
F/G. 3

AIR BEARING SLITTER

FIELD OF THE INVENTION

The present invention relates to a slitter, more specifically the present invention relates to a paper slitter mounted on air bearing means to permit rotation and simultaneous axial movement of the slitter disc.

DESCRIPTION OF THE PRIOR ART

Paper machine slitters normally comprise a rotating slitter disc cooperating with a rotating cutter anvil mounted on the opposite side of the paper. One such slitter mechanism is shown in Canadian Patent 238,197 issued to Koegel et al. The slitter disc is mounted on bearings mounted in turn on a sleeve type bearing so that the slitter disc may rotate and slide axially relative to the cutter anvil. A spring means biases the disc into contact with the anvil. Slitters constructed in this manner have been used in the paper industry for many years but slitter disc knife life, i.e. time between sharpenings is not satisfactory. It has also been found that the above described slitter may not effectively be used with slitter discs coated with tungsten carbide, i.e. by flame coating or the like.

It is thus an object of the present invention to provide a paper slitter improving the knife life of the slitter disc.

It is a further object of the present invention to provide a slitter arrangement having a cutting disc coated with an abrasion resistant coating such as tungsten carbide.

SUMMARY OF THE INVENTION

Broadly, the present invention relates to a slitter comprising a slitter disc fixed on a hub mounted on an air bearing permitting both axial and rotational movement of the hub and slitter disc, an anvil member spaced from said hub and cooperating with said disc to slit the paper and means biasing said disc towards said anvil member. In the preferred arrangement, biasing means incorporate an air bearing to permit substantially frictionless rotational movement of the unit.

BRIEF DESCRIPTION OF THE DRAWINGS

Further features, objects and advantages will be evident from the following detailed description of the preferred embodiment of the present invention taken in conjunction with the accompanying drawings in which:

FIG. 1 is a schematic section view illustrating a slitter constructed in accordance with the present invention;

FIG. 3 is a partial end view looking from the right-hand side of FIG. 1.

DESCRIPTION OF THE PREFERRED EMBODIMENTS

Figure 2:
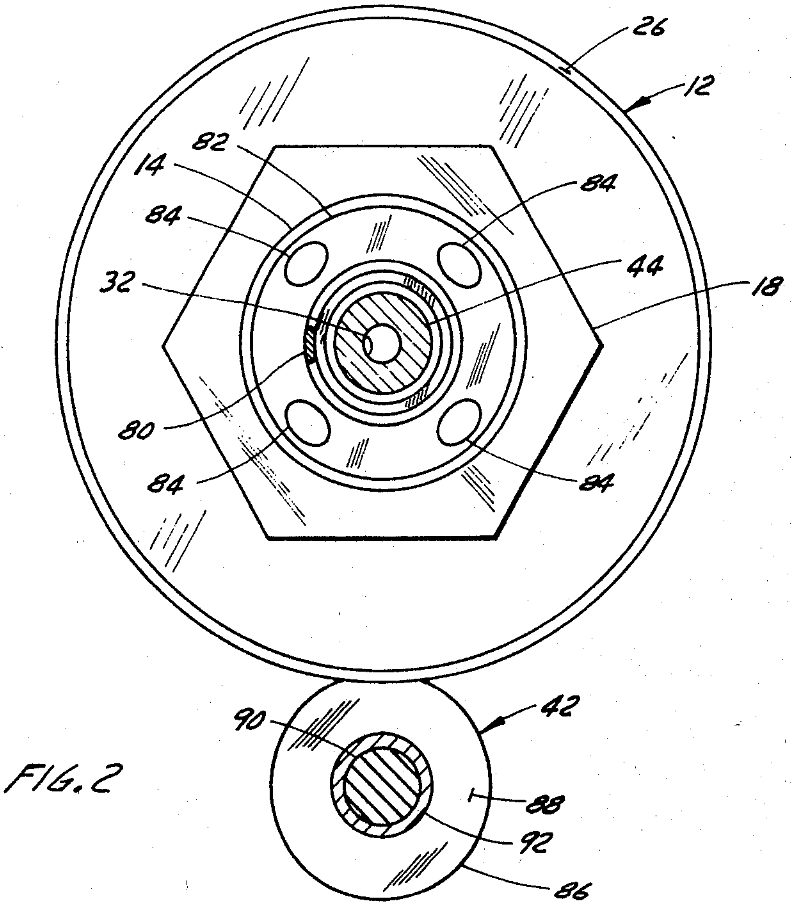
FIG. 2 is a section along the line 2—2 of FIG. 1.

The slitter generally illustrated at 10 in FIG. 1 comprises a slitter disc 12 mounted on a hub 14 by means of a collar 16 and a nut 18 threaded on the hub 14. The nut 18 moves the collar 16 against the back of the disc 12 and forces the disc into engagement with the shoulder 20 on the hub 14. It will be noted that the forces applied to the back of the disc are at a radius greater than that of the shoulder 20 thereby providing the disc with a degree of concavity on its inner or cutting face.

Preferably the disc 12 will be provided with a tungsten carbide coating 22 applied by a flame coating technique or the like to the inner or cutting face 24 of the disc. The disc 12 is ground as indicated at 26 to provide a sharpened peripheral edge. The tungsten carbide coating 22 is not absolutely essential to operability as improved knife life can be obtained without it. However, the tungsten carbide coating when used with the instant invention can extend knife life substantially. Disc mounting such as that disclosed in the above referred to patent could not effectively use slitter blades coated, for example, with tungsten carbide since the coating would chip and thereby reduce rather than extend knife life.

The hub 14 is mounted on a central shaft member 28 which forms the shaft of the air bearing. It will be noted that the shaft 28 is provided with a section of increased diameter as indicated at 30. It is on this section 30 that the hub 14 is received. The shaft 28 has an axial bore 32 connected via passages 34 to the surface of the shaft 28 in the large diameter section 30 and supplied with air under pressure via the tube 36.

The shaft 28 may be mounted in the frame 38 by means of a bolt 40 as illustrated or by any other suitable mechanism.

The slitter structure described hereinabove may be used with a suitable biasing means composed of a spring means pressing the hub 14 and thus the disc 12 at a given pressure against the anvil member 42. However, in the preferred system as illustrated, the shaft 28 is provided with an extension 44 on which is removably mounted a thrust type air bearing 46 forming part of the biasing means as will be described hereinbelow. The air bearing between the shaft 28 and the hub 14 permits substantial reduction in pressure between the disc 12 and anvil member 42 and this reduced pressure is believed to contribute significantly to increased knife life.

Extension 44 is bored to extend passage 32 and connect radial passages 48 which communicates with a circumferential groove or passage 50 adjacent the free end of extension 44. A pair of sealing rings 72 and 74 extend circumferentially of the extension 44 on opposite sides of the groove 50.

A thrust bearing 46 composed of a fixed section or reaction means 58 and a rotating or free section 60 having mating opposed conical faces 62 and 64 respectively extending at an angle of approximately 45° to the axis of the shaft 28 is mounted on the extension 44 adjacent the free end thereof.

The fixed section 58 has a bore 70 in which the extension 44 is received. Air passages 68 extend from face 62 to the bore 70 in a position to communicate with the groove 50, i.e. between the pair of spaced seals 72 and 74.

Movable section 60 of the bearing 46 has a circumferential inner flange 76 projecting from its forward face 78. A spring 80 encircles the flange 76 and bears against a flange 82 mounted on the hub 14 of the slitter thereby biasing the section 60 and hub 14 apart to press the disc 12 against the anvil 42. The flange 82 is provided with apertures 84 to permit the escape of air forming the fluid bearing between hub 14 and section 30 at the rear of the hub 14 to ensure operability of the bearing.

A latch 52 is pivotably mounted on a transverse shaft 54 and is received in a slot 56 at the free end of the extension 44. The latch 52 in its operative position is received in a groove 75 in the rear face 77 of member 58 and functions to prevent rearward and rotational movement of the member 58.

The slitter disc 12 cooperates with an anvil member 42 which comprises a cylindrical member 86 having a cutting face 88 mounted for rotation on a shaft 90. Generally there are a plurality of such anvil members 42 mounted on the shaft 90 and spaced apart by sleeve members 92. Preferably a tungsten carbide coating 87 is provided on the circumference of member 86 at least adjacent the face 88.

The slitter described hereinabove operates as follows.

Air under pressure is injected through the tube 36 and passageways 32 and 34 into the space between the hub 14 and the large diameter section 30 of the shaft 28 thereby to form an air bearing or cushion between the section 30 and the inner surface of the hub 14. Air escapes at each axial end of the hub 14, i.e. at the rear of hub 14, through the apertures 84 in the flange 82 and at the front into the free space between the frame 38 and the front end of the hub 14. The air bearing permits substantially frictionless rotational and axial movement of the hub 14 on section 30 of the bearing shaft 28.

The disc 12 is biased against the face 88 of the cutter anvil 42 by the spring 80 interposed between the flange 82 and the rotatable section 60 of the thrust bearing 46. The section 60 rotates freely relative to the fixed section 58 on the fluid (air) bearing formed between the faces 62 and 64 by air entering via passages 32 and 48, groove 50 and passages 68. The air bearing between the faces 62 and 64 supports section 60 for substantially frictionless rotational movement with the hub 14 through their interconnection by the spring 80, i.e. the hub 14 is rotated by contact of the disc 12 with the paper being cut and this rotates the flange 82 and thereby rotates the spring 80 and rotatable section 60 of the thrust bearing 46.

In the arrangement disclosed, both the hub 14 and the movable section 60 of the thrust bearing 46 are freely rotatable on air bearings and the hub 14 is axially movable on the bearing shaft 28 but is biased to the left in FIG. 1 by means of the spring 80 to push the coated surface 22 of the disc 12 lightly into contact with the face 88 of the anvil member 42. This arrangement permits relatively easy rotational and axial movement of the cutter disc 12 and ensures premature chipping of the coating 22 does not occur. Similarly, the coating 87 on the circumferential face of the anvil member 42 is protected by mounting of the disc 12 in the manner hereinabove described. A suitable spring pressure is obtained using a coil spring of 0.055 inch diameter wire having 5 turns of above 1⅛ inch diameter and requiring about 1450 grams to deflect a 2 inch long spring to ½ its length. The actual pressure exerted by such a spring under normal operating conditions depends on the paper being cut, but should be such that impact of the knife against the anvil by spring pressure (when a coated knife is used) does not damage the coating. It has been found that about 650 grams spring pressure is satisfactory for many applications.

A disc 12 may be changed, i.e. for sharpening or the like, by simply moving the latch member 52 on shaft 54 to unlatched position substantially perpendicular to that shown in FIG. 1 which requires moving bearing 46 toward hub 14 by compressing spring 80. In unlatched position the fixed section 58 may be slid off the end of the extension 44 followed by the movable section 60, the spring 80 and the hub 14. Thereafter, it is simply necessary to remove the nut 18, collar 16 and the disc 12 and replace same by a replacement disc 12 that has previously been sharpened and to re-assemble the unit.

The spring 80 biases the disc 12 against the anvil member 42, also forces the movable member 60 in the opposite direction thereby holding the member 58 in abutting relation with the latch mechanism 52 when the latch mechanism is in the position shown in FIG. 1.

Figure 4:
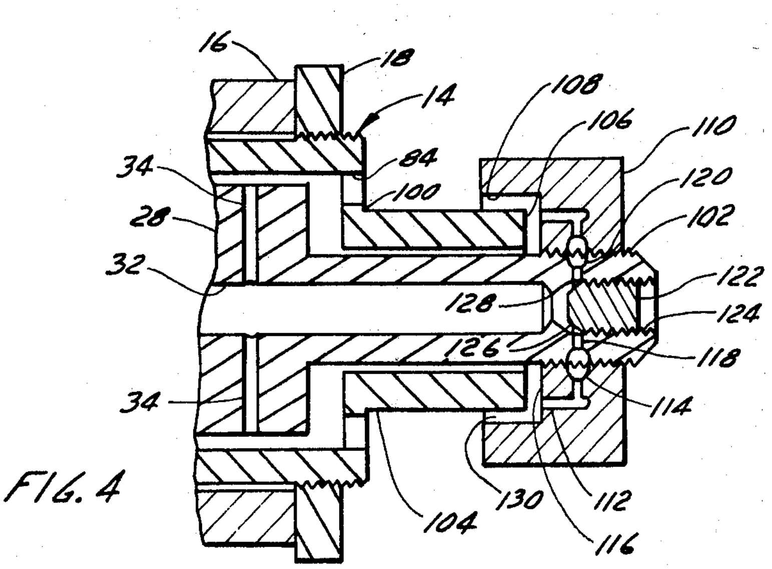
FIG. 4 is a schematic section illustrating a modified biasing arrangement.

A modified arrangement for biasing of the disc is shown in FIG. 4. In the FIG. 4 embodiment, the hub 14 has a flange 100 which may be integral therewith or may be a separate element connected thereto extending radially toward an extension 102 (similar to extension 44) of the shaft 28. Adjacent to and encircling the extension 102 is a cylindrical barrel 104 which is connected to or forms an integral part of flange 100. The barrel 104 which is connected to or forms an integral part of flange 100. The barrel 104 has a substantially radial rear face 106 received within a pocket 108 formed in an air bearing fixture or reaction means 110 threadably received on the free end of the extension 102. Air passages 112 in the fixture 110 lead from a circumferential groove 114 formed on the inner threaded surface of the fixture 110 and terminate on the surface 116 forming the bottom of the pocket 108. Air pressure is delivered to the groove 114 via an extension of the passage 32 through the extension 102 and radial passages 118 connected to a circumferential groove 120 on the extension 102 which groove 120 is in direct communication with groove 114.

Flow of air from the passage 32 into the radial passages 118 is adjustable by means of the plug 122 threadably received in the axially threaded bore 124 in extension 102. The plug 122 has a conical tapered surface 126 which cooperates with a surface formed by a circumferential projection 128 extending into the passage 32 to form a needle valve-like device and whereby movement of the plug 122 relative to the projection 128 adjust the air pressure in the pocket 108.

The FIG. 4 embodiment operates essentially the same as the FIG. 1 embodiment with the exception that the spring 80 is replaced by the air bearing formed betweeen the face 106 and the face 116. In this arrangement, the pocket 108 surrounds the end of the barrel 104 and air injected between the faces 106 and 116 bias these faces apart. The air pressure developed in the pockets 108 and thus the amount of thrust applied to the end face 106 forcing the hub 14 to the left is dependent on the position of the needle valve 122. Air injected into the pocket 108 escapes through the circumferential clearance 130 between the pocket 108 and the barrel 104 and through the clearance between barrel 104 and extension 102 out through the apertures 84 in the flange. The escape routes may be sealed or restricted further, however, any such seal of restriction must permit relative axial movement of the barrel 104 and fixture 110. In the arrangement illustrated, movement of the barrel 104 in the pocket 108 does not materially change the resistance to air flow out of the pocket 108 and thus the biasing pressure applied to the disc 12 is substantially independent of the relative position of the barrel in the pocket 108 and depends substantially solely on the position of the needle valve 122.

It is sometimes desirable to rotate the hub 14 to facilitate threading of the web to be cut. This is particularly important in a web driven slitter. The air bearing slitter of the initial invention may easily be adapted to tend to drive the hub 14 by inclining the passages 34 at least adjacent the surface of the section 30 so that the air issuing from the passages 34 has a component in the direction in which the hub 14 is to be rotated.

Modifications may be made without departing from the spirit of the invention as defined in the appended claims.

I claim:

1. A slitter comprising a slitter disc, a hub, means for mounting said disc on said hub, a shaft extending through and mounting said hub for axial and rotational movement, means for injecting air between said shaft and said hub thereby to provide an air bearing between said shaft and said hub to permit relative rotational axial movement of said hub on said shaft, an anvil member, means for biasing said hub in one axial direction on said shaft thereby to press said slitter disc into cutting relationship with said anvil member, said biasing means including means fixed on said shaft and defining a reaction member for said biasing means.

2. A slitter as defined in claim 1 wherein said slitter disc has tungsten carbide coating on its face cooperating with said anvil.

3. A slitter as defined in claim 2 wherein said anvil has a circumferential coating of tungsten carbide on its peripheral face.

4. A slitter as defined in claim 1 wherein said biasing means comprises an air thrust bearing means having a rotatable section and a non-rotatable section, said non-rotatable section being formed by said reaction member, a spring interposed between said rotatable section and said hub, biasing said hub in said direction.

5. A slitter as defined in claim 1 wherein said biasing means comprises a barrel projecting axially from said hub, said reaction member forming an air bearing fixture having a pocket encircling at least a portion of said barrel, means for injecting air under pressure into said pocket to urge said barrel out of said pocket and thereby bias said hub in said direction.

6. A slitter as defined in claim 1 wherein said means for injecting air injects air in a direction having a component to rotate said hub, whereby said injected air tends to rotate said hub.

* * * * *